United States Patent [19]

Hamilton et al.

[11] 3,714,089

[45] Jan. 30, 1973

[54] CURABLE COMPOSITIONS

[75] Inventors: Stephen B. Hamilton, Schenectady; Melvin D. Beers, Ballston Lake; Abe Berger; Terry G. Selin, both of Schenectady, all of N.Y.

[73] Assignee: General Electric Company

[22] Filed: May 4, 1970

[21] Appl. No.: 34,584

[52] U.S. Cl. ............260/18 S, 117/124 F, 117/135.1, 117/138.8 A, 117/148, 260/9 R, 260/9 C, 260/37 SB, 260/45.7 R, 260/45.7 S, 260/45.75 R, 260/46.5 Y, 260/46.5 G, 260/448.2 R
[51] Int. Cl. ...............................................C08h 9/00
[58] Field of Search..........260/46.5 Y, 46.5 G, 18 SI, 260/37 SI, 448.2 R

[56] References Cited

UNITED STATES PATENTS

| | | | |
|---|---|---|---|
| 3,296,195 | 1/1967 | Goossens | 260/46.5 |
| 3,338,951 | 8/1967 | Knaub | 260/46.5 |
| 3,494,950 | 2/1970 | Simmler et al. | 260/448.2 |
| 3,296,161 | 1/1967 | Kulpa | 260/18 |

Primary Examiner—Donald E. Czaja
Assistant Examiner—Melvyn I. Marquis
Attorney—Donald J. Voss, Donavon L. Favre, Frank L. Neuhauser, Oscar B. Waddell and Joseph B. Forman

[57] ABSTRACT

Room temperature vulcanizing silicone elastomers are prepared by the addition of a novel, fluid at room temperature, cross linking agent such as acetoxyethyltriacetoxysilane to a silanol chain-stopped polydiorganosiloxane fluid. These compositions are stable, free flowing fluids in the absence of moisture but cure to the rubbery, solid elastic state upon exposure to moisture. The compositions are particularly useful in bonding windshields to a supporting structure in automobiles.

43 Claims, No Drawings

CURABLE COMPOSITIONS

BACKGROUND OF THE INVENTION

This invention pertains to fluid organopoly-siloxanes which are capable of vulcanizing at room temperature to rubbery materials, to the cross-linking, chain-extending and chain-terminating agents used in such compositions, and to the process of incorporating the agents into the compositions.

The prior art room temperature vulcanizing materials (RTV's) comprise a linear polymer and a cross-linking agent.

The prior art cross-linking agents which have commercial success are either solid at room temperature, unstable at room temperature, or both. A disadvantage of the prior art cross-linking agents which are solid at room temperature is that they must be heated to the liquid state prior to use. This necessitates an extra step in the manufacture of sealants utilizing this type of cross-linking agent and requires that all storage tanks and lines used to carry this agent be heated. Serious problems occasionally result when a heating element for one of the tanks or lines is defective and the cross-linking agent is allowed to crystallize. Considerable product that is deficient in cross-linking agent may be produced and packaged and both equipment and personnel time is lost while the equipment is repaired. Cross-linking agents which are unstable at room temperature cause problems also in that they must be maintained under refrigeration prior to use. Failure to maintain the materials under refrigeration results in disproportionation, and again a defective product.

The prior art cross-linking systems are exemplified by the disclosures contained in U.S. Pat. No. 3,035,016 of Bruner which issued in 1962 and U.S. Pat. No. 3,296,195 of Goossens which issued in 1967. This invention is also related to the invention described and claimed in the co-pending application of Bruce A. Ashby, Ser. No. 598,967, filed Dec. 5, 1966 now U.S. Pat. No. 3,584,023, for Acetoxyalkylacetoxysilanes of the formula,

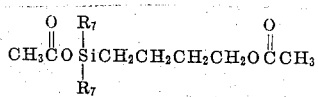

The Ashby application describes a silane containing only one silicon-bonded acetoxy group and only one alkyl-bonded acetoxy group. In the above formula, selected from the group, $R^7$ is a monovalent hydrocarbon radical preferably methyl or phenyl. The disclosed utility in the Ashby application is that the silicon-bonded acetoxy group makes the material reactive with a silicone and the alkyl-bonded acetoxy group makes the compound reactive with a polyester forming composition by an ester interchange reaction. The Ashby application does not describe the usefulness of the material in a one-package room temperature vulcanizing material. Due to the fact that the Ashby materials are monofunctional with respect to silicon reactivity, they are useful as chain terminating agents in the present compositions.

SUMMARY OF THE INVENTION

In accordance with this invention, the organopolysiloxane RTV's comprise a silanol chain-stopped polydiorganosiloxane and at least one silane of the formula, (1) 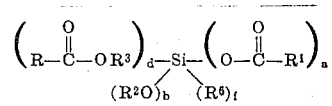

wherein $R^1$ is at least one radical having not more than about 8 carbon atoms selected from the group consisting of hydrocarbyl and halohydrocarbyl, $R^6$ is at least one radical selected from the same group as $R^1$, R and $R^2$ are each at least one radical having not more than about 8 carbon atoms selected from the group consisting of hydrocarbyl, halo-hydrocarbyl, nitrohydrocarbyl, alkoxyhydrocarbyl and cyano lower alkyl and may be different, $R^3$ is at least one divalent radical having from about two to about four carbon atoms selected from the group consisting of divalent saturated hydrocarbon radicals, and halo and alkoxy-substituted divalent saturated hydrocarbon radicals, $a$ is an integer of 1 through 3, $b$ is a whole number of 0 through 2, $d$ is an integer of 1 through 3, $f$ is a whole number of 0 through 2, and the sum of $a$, $b$, $d$ and $f$ is 4.

The novel cross-linking agents and chain extending agents of the present invention are represented by the formula, (2) 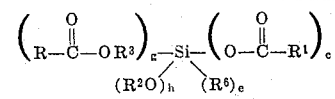

wherein R, $R^1$, $R^2$, $R^3$, and $R^6$ are as defined in formula (1), $c$ is an integer of 2 through 3, $e$ is a whole number of 0 through one, $g$ is an integer of one through 2, and $h$ is a whole number of 0 through 1.

The term hydrocarbyl as used herein means a hydrocarbon from which one hydrogen atoms has been removed, i.e., a monovalent hydrocarbon radical.

The abbreviation RTV as used herein means a room temperature vulcanizable material.

When acetoxyalkyl-substituted silanes of formula (1) are used to cross-link silanol chain-stopped polydiorganosiloxanes, the heating requirements, refrigeration requirements and instability problems of the prior art materials no longer exist. The acetoxyalkyl-substituted silanes of this invention are fluid and stable at room temperature.

DESCRIPTION OF PREFERRED EMBODIMENTS

The silanol chain-stopped polydiorganosiloxanes useful in the RTV compositions of this invention can be represented by the formula, (3) 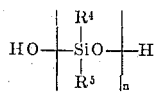

wherein $R^4$ and $R^5$ are each organic radicals of not more than 8 carbon atoms selected from the group consisting of hydrocarbyl, halohydrocarbyl and cyano lower alkyl, and $n$ is a number from about 10 to about 15,000 or more.

The silanol chain-stopped polydiorganosiloxanes are well known in the art and include compositions containing different $R^4$ and $R^5$ groups. For example, the $R^4$ groups can be methyl, while the $R^5$ groups can be phenyl and/or beta-cyanoethyl. Furthermore, within the scope of the definition of polydiorganosiloxanes useful in this invention are copolymers of various types of diorganosiloxane units, such as silanol chain-stopped copolymers of dimethylsiloxane units, diphenylsiloxane units and methylphenylsiloxane units or, for example, copolymers of dimethylsiloxane units, methyl-phenylsiloxane units and methylvinylsiloxane units. Preferably, at least 50 percent of the $R^4$ and $R^5$ groups of the silanol chain-stopped polydiorganosiloxanes are methyl groups.

A mixture of various silanol chain-stopped polydiorganosiloxanes also can be employed. The silanol chain-stopped materials useful in the RTV compositions of this invention have been described as polydiorganosiloxanes but such materials can also contain minor amounts, e.g., up to about 20 percent of monoorganosiloxane units such as monoalkylsiloxane units, e.g., monomethylsiloxane units and monophenylsiloxane units. The technology involved in incorporating monoalkylsiloxane units into RTV compositions is disclosed in U.S. Pat. No. 3,382,205 of Beers (1968), which is hereby incorporated into the present case by reference. The silanol chain-stopped materials may also contain triorganosiloxane units, such as trialkylsiloxane units, e.g., trimethylsiloxane units, tributylsiloxane units and triphenylsiloxane units. The silanol chain-stopped materials can also contain t-alkoxysiloxane units, e.g., t-butoxy-siloxane units, t-pentoxysiloxane units, and t-amyloxy-siloxane units. Effective results can be obtained if sufficient t-alkoxysiloxane is utilized in combination with the silanol-terminated polydiorganosiloxane of formula (3) to provide a polymer having a ratio of t-alkoxysiloxane units to silanol of 0.05 to 0.9 and preferably 0.2 to 0.8 tertalkoxydialkylsiloxy units per silanol. Many of the t-alkoxysiloxanes useful as part of the silanol chain-stopped materials are described and claimed in U.S. Pat. No. 3,438,930 of Beers, which issued Apr. 15, 1969, the disclosure of which is expressly incorporated herein by reference.

The silanol chain-stopped polydiorganosiloxanes employed in the practice of the present invention can vary from thin fluids to viscous gum, depending upon the value of $n$ and the nature of the particular organic groups represented by $R^4$ and $R^5$.

In the above formulas 1 and 2, R and $R^2$ can be, for example, mononuclear aryl, such as phenyl, benzyl, tolyl, xylyl and ethylphenyl; halogen-substituted mononuclear aryl, such as 2,6-di-chlorophenyl, 4-bromophenyl, 2,5-di-fluorophenyl, 2,4,6-trichlorophenyl and 2,5-dibromophenyl; nitro-substituted mononuclear, such as 4-nitrophenyl and 2,6-dinitrophenyl; alkoxy-substituted mononuclear aryl, such as 4-methoxyphenyl, 2,6-dimethoxyphenyl, 4-t-butoxyphenyl, 2-ethoxyphenyl, and 2,4,6-trimethoxyphenyl; alkyl such as methyl, ethyl, n-propyl, isopropyl, n-butyl, sec-butyl, isobutyl, tert-butyl, amyl, hexyl, heptyl, octyl, and the various homologs and isomers of alkyl of not more than about eight carbon atoms; alkenyl such as vinyl, allyl, n-butenyl-1, n-butenyl-2, n-pentenyl-2, n-hexenyl-2, 2,3dimethylbutenyl-2, n-heptenyl, and the various homologs and isomers of alkenyl of not more than about eight carbon atoms; alkynyl such as propargyl, 2-butynyl and the various homologs and isomers of alkynyl of not more than about eight carbon atoms; haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tertbutyl, 1,3,3-trichlorobutyl, 1,3,3-tribromobutyl, chloropentyl, bromopentyl, 2,3-dichloropentyl, 3,3-dibromopentyl, chlorohexyl, bromohexyl, 2,4-dichlorohexyl, 1,3-dibromohexyl, 1,3,4-trichlorohexyl, chloroheptyl, bromoheptyl, fluoroheptyl, 1,3-dichloroheptyl, 1,4,4-trichloroheptyl, 2,4-dichloromethylheptyl, chlorooctyl, bromooctyl, iodooctyl, 2,4-dichloromethylhexyl, 2,4-dichlorooctyl, 2,4,4-trichloromethylpentyl, 1,3,5-tribromooctyl and the various homologs and isomers of haloalkyl of not more than about eight carbon atoms; haloalkenyl such as chlorovinyl, bromovinyl, chloroallyl, bromoallyl, 3-chloro-n-butenyl-1, 3-chloro-n-pentenyl-1, 3-fluoro-n-heptenyl-1, 1,3,3-trichloro-n-heptenyl-5, 1,3,5-trichloro-n-octenyl-6, 2,3,3-trichloromethylpentenyl-4 and the various homologs and isomers of haloalkenyl of not more than about eight carbon atoms; haloalkynyl such as chloropropargyl, bromopropargyl and the various homologs and isomers of haloalkynyl of not more than about eight carbon atoms; nitroalkyl such as nitromethyl, nitroethyl, nitro-n-propyl, nitro-n-butyl, nitropentyl, 1,3-dinitroheptyl and the homologs and isomers of nitroalkyl of not more than about eight carbon atoms; nitroalkenyl such as nitroallyl, 3-nitro-n-butenyl-1, 3-nitro-n-heptenyl-1, and the various homologs and isomers of nitroalkenyl of not more than about eight carbon atoms; nitroalkynyl such as nitropropargyl and the various homologs and isomers of nitroalkynyl of not more than about 8 carbon atoms; alkoxyalkyl and polyalkoxyalkyl such as methoxymethyl, ethoxymethyl, butoxymethyl, methoxyethyl, ethoxyethyl, ethoxyethoxyethyl, methoxyethoxymethyl, butoxymethoxyethyl, ethoxybutoxyethyl, methoxypropyl, butoxypropyl, methoxybutyl, butoxybutyl, methoxypentyl, butoxypentyl, methoxymethoxypentyl, butoxyhexyl, methoxyheptyl and the various homologs and isomers of alkoxyalkyl and polyalkoxyalkyl of not more than about eight carbon atoms; alkoxyalkenyl and polyalkoxyalkenyl such as ethoxyvinyl, methoxyallyl, butoxyallyl, methoxy-n-butenyl-1, butoxy-n-pentenyl-1, methoxyethoxy-n-heptenyl-1, and the various homologs and isomers of alkoxyalkenyl and polyalkoxyalkenyl of not more than about 8 carbon atoms; alkoxyalkynyl and polyalkoxy-alkynyl such as methoxypropargyl and the various homologs and isomers of alkoxyalkynyl and polyalkoxyalkynyl of not more than about eight carbon atoms; cycloalkyl, cycloalkenyl and alkyl, halogen, alkoxy and nitro-substituted cycloalkyl and cycloalkenyl such as cyclopentyl, cyclohexyl, cycloheptyl, cyclooctyl, 6-methylcyclohexyl, 3,4- dichlorocyclohexyl, 2,6-dibromocycloheptyl, 6-methoxycyclooctyl, 2-nitrocyclopentyl, 1-cyclopentenyl, 3-methyl-1-cyclopentenyl, 5-methoxy-1-cyclopentenyl, 3,4-dimethyl-1-cyclopentenyl, 2,5-dimethoxy-1-cyclopentenyl, 5-methyl-5-cyclopentenyl, 3-4-dichloro-5-cyclopentenyl, 5-(tert-butyl)-1-cyclopentenyl, 2-nitro-1-cyclohexenyl, 1-cyclohexenyl, 3-methyl-1-cyclohexenyl, 3,4-dimethyl-1-cyclohexenyl and 6-methoxy-1-cyclohexenyl; and cyano lower alkyl such as cyanomethyl, beta-cyanoethyl, gamma-cyanopropyl, delta-cyanobutyl, and gamma-cyanoisobutyl.

In formulas (1) and (2), $R^1$ and $R^6$ can be hydrocarbyl and halohydrocarbyl such as those listed above for R and $R^2$.

The $R^3$ radicals present are, for example $-CH_2-CH_2-$,

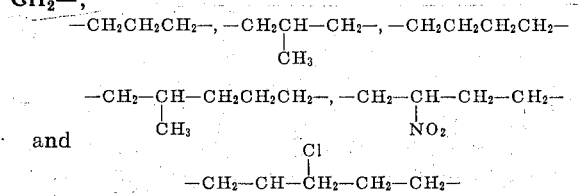

In formula (3), the hydrocarbyl and substituted hydrocarbyl, $R^4$ and $R^5$, can be those radicals listed above for R and $R^2$.

Examples of silanes useful in the RTV compositions of this invention include the following:

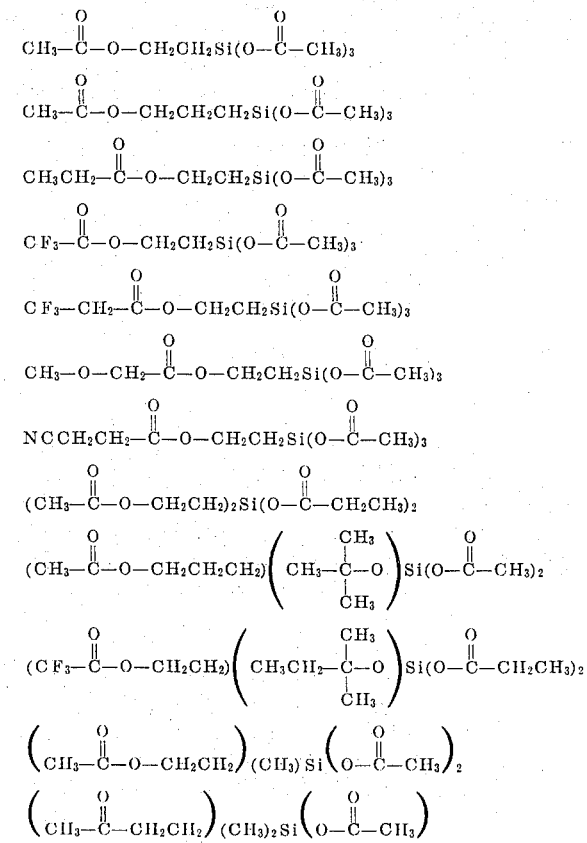

Other examples are readily apparent from the description of the substituents which may be present on the silane.

The RTV compositions of the present invention are prepared by simply admixing one or more of the silanes of formula (1), having an average of at least about 2.05 silicon-bonded acyloxy radicals per silicon atom with the silanol chain-stopped polydiorganosiloxane. The components are preferably at room temperature during mixing. Since the silanes tend to hydrolyze upon contact with moisture, care should be exercised to exclude moisture during the addition of the silane to the silanol chain-stopped polydiorganosiloxane. Likewise, care should be taken that the mixture of the silane and the silanol chain-stopped polydiorganosiloxane is maintained under substantially anhydrous conditions if it is desired to store the admixture for an extended period of time prior to conversion of the composition to the cured, solid, elastic silicone rubber state. On the other hand, if it is desired to permit the mixture to cure immediately upon admixture of the silane and the polydiorganosiloxane, no special precautions are necessary and the two components can be mixed and placed in the form or shape in which it is desired for the composition to be cured.

The amount of the silane admixed with the silanol chain-stopped polydiorganosiloxane can vary within wide limits. However, for best results, it is preferred to add an excess of one mole of the silane per mole of silanol groups in the silanol chain-stopped polydiorganosiloxanes. Satisfactory curing can be obtained, for example, with from 1.0 to 4 moles of the silane per mole of silanol groups in the polydiorganosiloxane. No particular benefit is derived from using more than 4 moles of the silane per mole of the polydiorganosiloxane. The temperature at which the silane and the silanol chain-stopped polydiorganosiloxane are admixed is not critical and a room temperature addition is usually employed.

The admixture can be carried out in the presence of an inert solvent (that is a solvent which will not react with the silanol, alkoxy or acyloxy groups on the silicon). Suitable solvents include hydrocarbons such as benzene, toluene, xylene or petroleum ethers; halogenated solvents such as perchloroethylene or chlorobenzene and organic ethers such as diethylether and dibutylether; ketones such as methylisobutylketone and fluid hydroxyl-free polysiloxanes.

The presence of a solvent is particularly advantageous when the silanol chain-stopped polydiorganosiloxane is a high molecular weight gum. The solvent reduces the overall viscosity of the composition and facilitates cure. The RTV compositions may be kept in the solvent until they are to be used. This particularly valuable when a gummy composition is to be employed in coating applications.

Adhesion to various substrates containing an oxide film can be improved by the addition of a di-t-alkoxydiacetoxysilane to the RTV composition. The technology involved in the addition of this material is disclosed in U.S. Pat. No. 3,296,161 of Kulpa, which is hereby incorporated by reference.

The RTV compositions of this invention are stable in the absence of moisture. Consequently, they can be stored for prolonged periods of time without deleterious effect. During this period of storage no significant change occurs in the physical properties of the RTV compositions. This is of particular importance from a commercial standpoint, since it assures that once an RTV composition is prepared with a certain consistency and cure time that neither will change significantly upon storage. Storage stability is one of the characteristics which makes the compositions of this invention particularly valuable as a one component room temperature vulcanizing composition.

A wide choice of components is available in the preparation of the RTV compositions of the present invention. In general, the particular components employed are a function of the properties desired in the cured silicone rubber. Thus, with a particular silane, some variation in the properties of the cured silicone rubber are obtained by varying the molecular weight (as measured by viscosity) of the silanol chain-stopped polydiorganosiloxane. For a given system, as the viscosity of the silanol chain-stopped starting material increases, the hardness of the cured rubber decreases while the elongation increases. On the other hand, with a lower viscosity material, the cure is tighter so that the cured rubber has a lower elongation and increased hardness.

RTV compositions prepared by mixing the silane with the silanol chain-stopped polydiorganosiloxanes can be used without further modification in many sealing, caulking or coating applications by merely placing the compositions in the desired place and permitting them to cure upon exposure to the moisture present in the atmosphere. Upon exposure of such compositions to atmospheric moisture, even after storage for times as long as two years or more, a "skin" will form on the compositions shortly after exposure and cure to the rubbery state will occur within 12 to 24 hours, all at room temperature. The time required for the formation of such skin can vary from a minimum of about 5 to 10 minutes to a maximum of about 1 hour.

It is often desirable to modify the RTV compositions of the present invention by the addition of various materials which act as extenders or which change various properties such as cure rate and color. For example, if it is desired to reduce the time required for complete cure, the composition can be modified by the incorporation of a minor amount of carboxylic acid salt and/or chelates of a metal ranging from lead to manganese, inclusive, in the electromotive series of metals. The particular metals included are lead, tin, nickel, cobalt, iron, cadmium, chromium, zinc and manganese. The carboxylic acids from which the salts of these metals are derived can be monocarboxylic acids or dicarboxylic acids and the metallic salts can be either soluble or insoluble in the silanol chain-stopped polydiorganosiloxane. Preferably, the salts employed are soluble in the silanol chain-stopped polydiorganosiloxane since this facilitates the uniform dispersion of the salt in the reaction mixture.

Illustrative of metal salts which can be employed are, for example, zinc naphthenate, lead naphthenate, cobalt naphthenate, iron 2-ethylhexoate, cobalt octoate, zinc octoate, lead octoate, chromium octoate and tin octoate. Operative metal salts include those in which the metallic ion contains a hydrocarbon substituent such as, for example, carbomethoxyphenyl tin tris-uberate, isobutyl tin triceroate, cyclohexenyl lead triactotinate, xenyl lead tris-alicylate, dimethyl tin dibutyrate, basic dimethyl tin oleate, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin bis-trichlorobenzoate, diphenyl lead diformate, dibutyl tin dilacetate, dicyclopentyl lead bis-monochloroacetate, dibenzyl lead di-2-pentanoate, diallyl lead di-2-hexenoate, triethyl tin tartrate, tributyl tin acetate, triphenyl tin acetate, tricyclohexyl tin acrylate, tritolyl tin terephthalate, tri-n-propyl lead acetate, tristearyl lead succinate, trinaphthyl lead p-methylbenzoate, trisphenyl lead cyclohexenyl acetate, triphenyl lead ethylmalonate, etc.

The amount of the metal salt of the organic carboxylic acid which can be employed is a function of the increased rate of curing desired so that any amount of such salt up to the maximum effective amount for increasing the cure rate can be employed. In general, no particular benefit is derived from employing more than about 5 percent by weight of such metal salt based on the weight of the silanol chain-stopped polydiorganosiloxane. Preferably, where such metal salt is employed, it is present in an amount equal to from about 0.01 to 2.0 percent by weight, based on the weight of the polydiorganosiloxane.

Metal chelates such as those disclosed in U.S. Pat. Nos. 3,334,067 and 3,065,194 can also be used in the RTV compositions of this invention as catalysts in amounts from about 0.01 part to about 10 parts based on 100 parts of the silanol chain-stopped polydiorganosiloxane.

The RTV compositions of the present invention can also be varied by the incorporation of various extenders or fillers. Illustrative of the many fillers which can be employed with the compositions of the present invention are titanium dioxide, lithopone, zinc oxide, zirconium silicate, silica aerogel, iron oxide, diatomaceous earth, calcium carbonate, fumed silica, silazane treated silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc. Silazane treated silica fillers such as those disclosed and claimed in application Ser. No. 789,352 of Smith filed Jan. 6, 1969 now U.S. Pat. No. 3,635,743, and particularly suitable for use in the RTV compositions of the present invention, they are generally employed in amounts from about 5 to about 200 parts filler, per 100 parts of silanol chain-stopped polydiorganosiloxane.

In addition to the modification of the RTV compositions of the present invention by addition of metal salt, cure accelerators and fillers, these compositions can also be modified by the incorporation of various flame retardants, stabilizing agents and plasticizers such as siloxane fluids. Suitable flame retardants include antimony oxide, various polychlorinated hydrocarbons and organic sulfonates.

Where the compositions of the present invention contain components other than the silane and the polydiorganosiloxane, the various ingredients can be added in any desired order. However, for ease of manufacturing it is often convenient to form a blend or mixture of all of the components of the room temperature vulcanizing organopolysiloxane except the silane, to then remove moisture from the resulting mixture by maintaining the mixture under vacuum and thereafter to add the silane prior to packaging of the composition in containers protected from moisture.

The RTV compositions of the present invention are particularly adapted for caulking and sealing applications where adhesion to various surfaces is important. For example, these materials are useful in household caulking applications and industrial applications such as on buildings, factories, automotive equipment and in applications where adhesion to masonry, glass, plastic, metal and wood is required.

The silanes of the present invention, i.e., those represented by formulas (1) and (2) are made by the following general procedure. The first step of the procedure involves reacting a silane with an olefinically unsaturated ester via the following SiH-olefin addition reaction to produce the following composition,

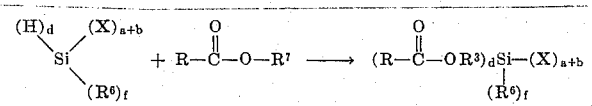

In the above formulas, R, R³, R⁶, a, b, d and f are as above defined, R⁷ is an unsaturated radical having from about two to about eight carbon atoms selected from the group consisting of olefinically unsaturated hydrocarbon radicals and halo, nitro and alkoxy-substituted olefinically unsaturated hydrocarbon radicals, X is a halogen radical selected from the group consisting of F, Cl, Br and I and the sum of $a+b$ has a value of 1 through 3. The reaction is catalyzed by a platinum compound or platinum complex catalyst. Both the platinum compound catalysts and the platinum complex catalysts are well known in the art and are described among other places in U.S. Pat. Nos. 2,823,218 — Speier, 3,159,601 — Ashby, 3,159,662 — Ashby, and 3,220,972 — Lamoreaux.

Examples of compounds of the formula

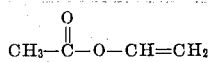

which can be employed in the above reaction include the following:

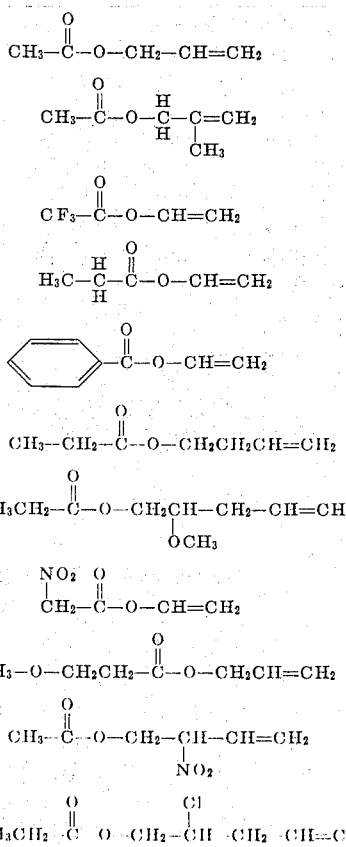

Acyloxy and/or alkoxy groups can now be added to the composition formed by the SiH-olefin addition reaction by a variety of techniques any of which are suitable. The techniques which can be employed are generally set forth in U.S. Pat. No. 3,296,195 of Goossens which issued Jan. 3, 1967. As a first technique, the silane produced by the SiH-olefin addition reaction can be reacted with acetic anhydride to produce a corresponding acetoxysilane or polyacetoxysilane plus acetyl chloride. The acetoxysilane or polyacetoxysilane is then reacted with the desired alkanol or halogenated nitro or alkoxy alkanol in the ratio of one mole of alkanol for every mole of silicon-bonded acetoxy groups that it is desired to replace. The product is then fractionally distilled to yield the desired product or a mixture of desired products. Alternative processes are set forth in the above-mentioned Goossens patent which is hereby incorporated by reference.

Examples of carboxylic acid anhydrides which may be employed in the above reaction include acetic anhydride, propionic anhydride, mixed anhydrides such as acetic propionic anhydride, α-chloro acetic acid anhydride and trifluoroacetic acid anhydride.

Examples of alkanols which may be employed in the above-described process include t-butyl alcohol, t-amyl alcohol, methanol, ethylene cyanohydrin, ethylene chlorohydrin, beta-nitroethanol, ethanol, sec-butanol, and methoxyethanol.

The silanes which can be employed as cross-linking agents, chain extending agents and modulus improving agents in RTV compositions are those within the scope of formula (1) 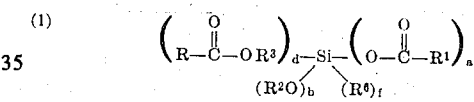

When the silane is employed as a cross-linking agent, a has a value of 3 and the preferred silanes are

and
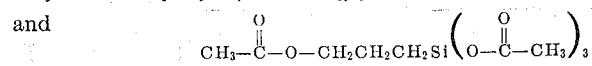

When it is desired to have a chain extending agent employed in combination with the cross-linking agent, a has a value of 2 resulting in the silane being difunctional. The preferred difunctional silanes are

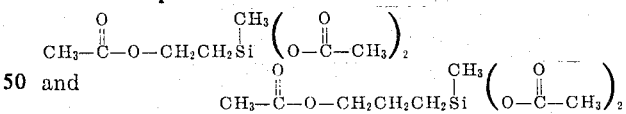

The presence of a chain extending agent results in a final cured product having a higher degree of elasticity. The same result would be obtained if a higher molecular weight silanol-stopped fluid were used, however, the use of such a higher molecular weight silanol-stopped fluid would result in a much higher viscosity of the curable composition resulting in difficulties in handling the extremely viscous material.

When it is desired to improve the modulus of elasticity, a silane of formula (1), where a has a value of 1, is incorporated into the RTV composition. The preferred silanes for this application are

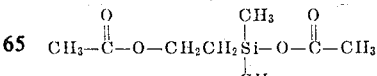
and
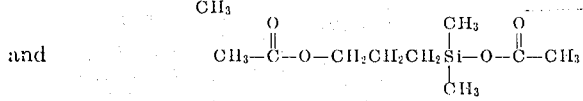

The use of this monofunctional silane chain terminating unit in combination with the cross-linking and optionally chain extending silanes discussed above, not only results in a higher modulus of elasticity but in many instances also improves the adhesion of the cured compositions to a substrate.

The adhesion of RTV's, cross-linked, chain extended and chain terminated by use of the above silanes, to specific substrates such as aluminum can be markedly improved by having one or more alkoxy groups as silicon substituents. The t-butoxy groups are preferred.

The preferred silanol chain-stopped polydiorganosiloxanes to be used in combination with the silane cross-linking agent described above are silanol chain-stopped polydiorganosiloxanes having a viscosity in the range of about 100 centipoises to 50,000 centipoises at 25° C. The preferred polydiorganosiloxanes are polydimethylsiloxanes having from about 10 to about 15,000 dimethylsiloxy units per molecule and can contain some t-butoxy groups. The presence of such tertiary alkoxy groups such as t-butoxy groups also improves the adhesion of the RTV's of the present invention to particular substrates.

Generally speaking, in the preferred embodiment of the present invention, R is an alkyl radical of not more than 4 carbon atoms, $R^1$ is an alkyl radical of not more than 4 carbon atoms, $R^2$ is a t-butyl radical, $R^3$ is an alkylene radical of not more than 4 carbon atoms, at least 50 percent of the groups represented by $R^4$ and $R^5$ are methyl radicals, remainder phenyl; and n is a number from 10 to 15,000.

When adhesion to an oxide film containing substrate is desired, di-t-butoxydiacetoxysilane can be added to the RTV composition. The amount added can vary from 0.2 to 6.0 parts by weight based upon the weight of the silanol stopped fluid.

The preferred silanes used in the RTV compositions described in the present invention contain on the average of from 2.05 to 3 silicon-bonded acetoxy groups per silane when a fluid containing two silanol end-stopper is employed. If the number of acetoxy groups where to be two this would merely result in a build-up of chain length. Average in this situation means the total number of silicon-bonded acetoxy groups divided by the total number of silane molecules used in the RTV composition. The number, of course, can drop below two when the silanol-stopped polydiorganosiloxane contains more than two silanol groups per molecule. This occurs when there is chain branching in the polydiorganosiloxane and no chain stopping with nonreactive groups such as t-butoxy groups or alkyl groups.

The preferred RTV compositions of the present invention include a tin catalyst such as dibutyltindilaurate or tin octoate. For deep section cure and some other curing needs the preferred catalyst is basic dimethyltinoleate.

The preferred RTV compositions of the present invention also include fillers. The most preferred of which is the silazane treated silica filler disclosed and claimed in application Ser. No. 789,352 of Smith, filed Jan. 6, 1969 now U.S. Pat. No. 3,635,743. The fillers are preferably used in amounts from about 10 to about 100 parts of filler, per 100 parts of the silanol chain-stopped polydiorganosiloxane.

The silazane treated filler can be prepared by the following procedure. A fumed silica filler is contacted with ammonia for about 1½ hours at 25° C with agitation. Hexamethyldisilazane is added to the treated filler in an amount of about 20 parts per 100 parts of treated filler and the mixture is heated to about 130° C for about 2 hours. Water in an amount of about one part by weight is added to the mixture and heating is continued at 130° C for an additional hour. The treated silica filler is then purged with $N_2$ at 130° C until the $NH_3$ content is 50 ppm.

The following examples are illustrative of the practice of the present invention and are not intended for purposes of limitation. All parts are by weight. The SiH-olefin addition catalyst which was used in the following examples was prepared according to the teachings of Example 1 of U.S. Pat. No. 3,229,972 of Lamoreaux, and the catalyst was dissolved in octyl alcohol to a concentration of 3.8 percent of platinum (as metal) based upon the total weight of the solution. The catalyst solution will hereinafter be referred to as "-catalyst."

EXAMPLE 1

To a reaction flask containing 200 parts of allyl acetate and ¼ parts of catalyst and heated to 100° C was slowly added 217 parts of trichlorosilane. A very exothermic reaction occurred. The reaction temperature was maintained at about 100° C by the rate of silane addition. Following complete silane addition, external heat was applied to maintain a reaction temperature of 110° C for two additional hours. Gas chromatographic analysis of the reaction composition at this time showed essentially complete reaction. Upon distillation a product having a boiling point of 113° C at 24 mm Hg. was obtained in a 92 percent yield. The composition was verified by an analysis of the hydrolyzable chloride content to be trichlorosilylpropylacetate.

To a one liter three-necked flask was added 224 parts of the trichlorosilylpropylacetate prepared above. To the flask was added 408 parts of acetic anhydride and upon stirring a mild exotherm was noted. The mixture was heated to reflux and acetyl chloride was removed by distillation to a reaction mixture temperature of 100° C. 50 parts of anhydrous sodium acetate was then added to the mixture and the mixture was stirred for 2½ hours at room temperature. The reaction mixture was then filtered and stripped at a pressure of 12 mm Hg. up to a pot temperature of 90° C. The product was identified by an infrared analysis as triacetoxysilylpropylacetate.

An RTV composition was prepared by mixing at room temperature 100 parts of a base compound, 5 parts of acetoxypropyltriacetoxysilane of 0.1 parts of dibutyltindilaurate. The base compound consisted of 100 parts of a 10,000 centipoises viscosity silanol-terminated polydimethylsiloxane of the formula

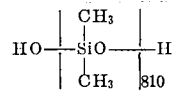

21 parts of octylmethylcyclotetrasiloxane treated fumed silica (the silica had a surface area of 200 square meters per gram), 3 parts of red iron oxide and 15 parts of a process aid prepared according to the teachings of U.S. Pat. No. 3,382,205. The process aid consisted of 5 mole per cent trimethylsiloxy units, 20 mole per cent monomethylsiloxy units, 75 mole per cent dimethylsiloxy units, and contained 5 weight per cent silanol. The process aid has a viscosity of 50 centipoises at 25° C and was devolatilized. The RTV was cured for 5 days at 77° F and 50 percent relative humidity. The following physical properties were obtained:

| | |
|---|---|
| Shore A | 28 |
| Tensile, psi | 345 |
| Elongation, % | 500 |
| Tear, Die B, lbs./in. | 37 |
| Tack Free Time, Minutes | 40 |

The application rate using a ⅛ inch Semco orifice at 90 psi was 430 grams per minute. Track free time refers to the time required for the material to become dry to the touch.

EXAMPLE 2

To 172 parts of vinyl acetate containing ¼ part of catalyst were added dropwise 271 parts of trichlorosilane. The initial reaction mixture temperature was 70° C and this temperature dropped to 52° C upon complete silane addition. The mixture was kept on total reflux by application of external heat. After a period of 4 hours, the pot temperature began to climb slowly at first but rapidly later on. At 118° C the reaction reached completion as verified by gas chromatographic analysis. Upon factional distillation, the product distilled at 83° C/21 mm Hg. in 90 percent yield. The acetoxylation was carried out in the same manner as described in Example 1. The structure of the composition was confirmed by infrared analysis and the purity of the product was established by gas chromatography. The product had the structural formula

An RTV was prepared using the acetoxyethyltriacetoxysilane. The RTV was prepared by mixing at room temperature 100 parts of the base compound described in Example 1, 5 parts of acetoxyethyltriacetoxysilane and 0.5 parts of dibutyltindiacetate. After curing for 5 days at 77° C and 50 percent relative humidity, the following physical properties were obtained:

| | |
|---|---|
| Shore A | 25 |
| Tensile, psi | 350 |
| Elongation, % | 510 |
| Tear, Die B, lbs./in. | 40 |
| Tack Free Time, Minutes | 35 |

Track free time refers to the time required for the material to become dry to the touch. The application rate using a ⅛ inch Semco orifice and 90 psi was 350 grams per minute.

EXAMPLE 3

An RTV composition was prepared by mixing at room temperature 100 parts of a base compound, 4 parts of acetoxyethyltriacetoxysilane, 1.5 parts of di-t-butoxydiacetoxysilane and 0.05 parts of dibutyltindilaurate. The base compound consisted of 100 parts of a 10,000 centipoises viscosity silanol-terminated polydimethylsiloxane of the formula

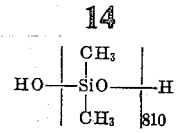

30 parts of a polydimethylsiloxane polymer having a viscosity of 570 centipoises and having on the average one terminal silanol group per polymer molecule and one terminal trimethylsilyl group per polymer molecule; and 23 parts of octamethylcyclotetrasiloxane treated fumed silica (the silica had a surface area of about 200 square meters per gram).

The RTV was cured for 3 days at 50 percent relative humidity and 77° F. The following physical properties were obtained:

| | |
|---|---|
| Shore A | 32 |
| Tensile, psi | 455 |
| Elongation, % | 500 |
| Tear, Die B, lbs./in. | 38 |
| Tack Free Time, Minutes | 20 |

The tack free time was measured by release from 2 mil polyethylene film. The application rate using a ⅛ inch Semco orifice at 90 psi was 350 grams per minute. The peel adhesion of the above RTV was compared with the peel adhesion of one of our standard RTV's. The cure time in this case was 7 days at 50 percent relative humidity and 77° F. The results are as follows:

| Substrate | Acetoxyethyltriacetoxysilane Based RTV | Standard RTV |
|---|---|---|
| Stainless Steel | 64 | 19 |
| Nickel | 61 | 20 |
| Bare Aluminum Alloy | 70 | 32 |
| Copper | 62 | 43 |

The peel adhesion data is given in lbs./in. All values were determined using a 20 mesh stainless steel screen imbedded in the sealant at a ⅛ inch bond line.

While the foregoing examples have illustrated a number of the embodiments of my invention, it is understood that the present invention relates to a broad class of room temperature curing silicone rubber compositions which are characterized by curing to the solid, elastic state at room temperature upon exposure to normal atmospheric moisture and which are further characterized by the crosslinking agent being stable and fluid at room temperature.

What I claim as new and desire to secure by Letters Patent of the United States is:

1. A fluid composition stable under substantially anhydrous conditions and curable to an elastic solid in the presence of moisture which comprises a silanol chain-stopped polydiorganosiloxane being represented by the formula,

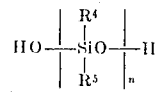

wherein $R^4$ and $R^5$ are each at least one radical having not more than eight carbon atoms selected from the class consisting of hydrocarbyl, halohydrocarbyl and cyano lower alkyl which radicals may all be the same or different, and n is a number from about 10 to about 15,000, and at least one silane represented by the formula,

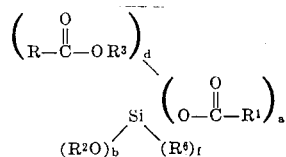

wherein $R^1$ is at least one radical having not more than about eight carbon atoms selected from the group consisting of hydrocarbyl and halohydrocarbyl, R and $R^2$ are each at least one radical having not more than about eight carbon atoms selected from the group consisting of hydrocarbyl, halohydrocarbyl, nitrohydrocarbyl, alkoxyhydrocarbyl and cyano lower alkyl and may be different, $R^3$ is at least one divalent radical having from about two to about eight carbon atoms selected from the group consisting of divalent saturated hydrocarbon radicals and halo, nitro and alkoxy-substituted divalent saturated hydrocarbon radicals, $R^6$ is selected from the same group as $R^1$, $a$ is an integer of 1 through 3, $b$ is a whole number of 0 through 2, $d$ is an integer of 1 through 3, $f$ is a whole number of 0 through 2, and the sum of $a$, $b$, $d$ and $f$ is 4.

2. The composition of claim 1 further characterized by at least about 50 per cent of the total number of $R^4$ and $R^5$ groups being methyl radicals.

3. The composition of claim 2 further characterized that 50 percent of the total number of $R^4$ and $R^5$ radicals being phenyl radicals.

4. The composition of claim 1 further characterized by R, $R^1$, $R^2$ and $R^6$ being alkyl radicals, and $R^3$ being a divalent saturated hydrocarbon radical.

5. The composition of claim 1 further characterized by R, $R^1$ and $R^6$ being alkyl radicals, $R^3$ being a divalent saturated hydrocarbon radical, and $b$ being 0.

6. The composition of claim 1 further characterized by R, $R^1$, $R^2$ and $R^6$ being alkyl radicals, $R^3$ being a divalent saturated hydrocarbon radical, and $b$ being 1.

7. The composition of claim 1 further characterized by R, $R^1$ and $R^6$ being alkyl radicals, $R^3$ being an ethylene radical, and $b$ being zero.

8. The composition of claim 7 further characterized by R, $R^1$ and $R^6$ being methyl and $R^3$ being a divalent saturated hydrocarbon radical.

9. The composition of claim 1 further characterized by R, $R^1$ and $R^6$ being methyl and $R^3$ being propylene and b being zero.

10. The composition of claim 1 further characterized by the mixture consisting of a silane being represented by the formula $$R-\overset{O}{\underset{\|}{C}}-O-R^3\underset{\underset{R^6}{|}}{Si}(O-\overset{O}{\underset{\|}{C}}-R^1)_2$$

mixed with a silane represented by the formula $$R-\overset{O}{\underset{\|}{C}}-O-R^3Si(O-\overset{O}{\underset{\|}{C}}-R^1)_3.$$

11. The composition of claim 10 further characterized by the mixture consisting of a silane being selected from the class consisting of

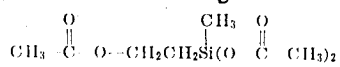

and

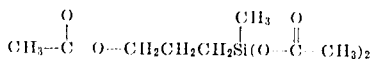

mixed with a silane selected from the group consisting of a silane being represented by the formula $$CH_3-\overset{O}{\underset{\|}{C}}-O-CH_2CH_2Si(O-\overset{O}{\underset{\|}{C}}-CH_3)_3$$

and a silane represented by the formula $$CH_3-\overset{O}{\underset{\|}{C}}-O-CH_2CH_2CH_2Si(O-\overset{O}{\underset{\|}{C}}-CH_3)_3.$$

12. The composition of claim 11 further characterized by the mixture consisting of a silane being represented by the formula $$(CH_3-\overset{O}{\underset{\|}{C}}-O-CH_2CH_2)_2Si(O-\overset{O}{\underset{\|}{C}}-CH_3)_2$$

and a silane represented by the formula

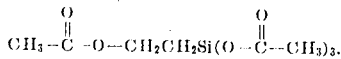

13. The composition of claim 1 further characterized by R, $R^2$ and $R^6$ being alkyl radicals, $R^3$ being an ethylene radical and $b$ being 1.

14. The composition of claim 1 further characterized by R, $R^1$, $R^2$ and $R^6$ being alkyl radicals, and $R^3$ being a propylene radical.

15. The composition of claim 1 further characterized by R, $R^1$ and $R^6$ being methyl radicals and $R^3$ being an ethylene radical.

16. The composition of claim 1 being further characterized by having a filler present.

17. The composition of claim 1 further characterized by having a filler and catalyst present which is selected from the class consisting of a carboxylic acid salt and a carboxylic acid chelate of a metal ranging from lead to manganese, inclusive, in the electromotive series of metals.

18. The composition of claim 1 further characterized by having a catalyst present which is selected from the class consisting of a carboxylic acid salt and a carboxylic acid chelate of a metal ranging from lead to manganese, inclusive, in the electromotive series of metals.

19. The composition of claim 18 further characterized by the catalyst being basic dimethyltinoleate.

20. The composition of claim 1 when cured to an elastic solid.

21. The composition of claim 1 further characterized by having at least about 50 per cent of the organo groups of the silanol chain-stopped polydiorganosiloxane being methyl radicals, R, $R^1$ and $R^6$ being alkyl radicals, $R^2$ being a t-butyl radical and $R^3$ being an ethylene radical.

22. The composition of claim 1 further characterized by having at least about 50 per cent of the organo groups of the silanol chain-stopped polydiorganosiloxane being methyl, R, $R^1$ and $R^6$ being methyl radicals, $R^3$ being a propylene radical and $b$ being 0.

23. A method of forming a fluid composition stable under substantially anhydrous conditions and curable to an elastic solid in the presence of moisture which comprises mixing in the substantial absence of moisture, a silanol chain-stopped polydiorganosiloxane being represented by the formula,

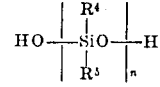

wherein $R^4$ and $R^5$ are each at least one radical having not more than eight carbon atoms selected from the class consisting of hydrocarbyl, halohydrocarbyl and cyano lower alkyl which radicals may all be the same or different, and $n$ is a number from about 10 to about 15,000, and at least one silane represented by the formula,

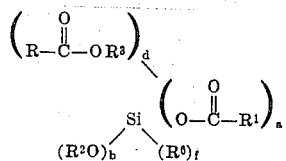

said silane being at room temperature during mixing and having an average of at least 2.05 silicon-bonded acyloxy radicals per silicon atom, wherein $R^1$ is at least one radical having not more than about eight carbon atoms selected from the group consisting of hydrocarbyl and halohydrocarbyl, R and $R^2$ are each at least one radical having not more than about eight carbon atoms selected from the group consisting of hydrocarbyl, halohydrocarbyl, nitrohydrocarbyl, alkoxy-hydrocarbyl and cyano lower alkyl and may be different, $R^3$ is at least one divalent radical having from about two to about eight carbon atoms selected from the group consisting of divalent saturated hydrocarbon radicals and halo, nitro and alkoxy-substituted divalent saturated hydrocarbon radicals, $R^6$ is selected from the same group as $R^1$, $a$ is an integer of 1 through 3, $b$ is a whole number of 0 through 2, $d$ is an integer of 1 through 3, $b$ is a whole number of 0 through 2, and the sum of $a, b, d$ and $f$ is 4.

24. The method of claim 23 further characterized by at least about 50 per cent of the total number of $R^4$ and $R^5$ groups being methyl radicals.

25. The method of claim 23 further characterized that 50 percent of the total number of $R^4$ and $R^5$ radicals being phenyl radicals.

26. The method of claim 23 further characterized by R, $R^1$, $R^2$ and $R^6$ being alkyl radicals, and $R^3$ being a divalent saturated hydrocarbon radical.

27. The method of claim 23 further characterized by R, $R^1$ and $R^6$ being alkyl radicals, $R^3$ being a divalent saturated hydrocarbon radical, and $b$ being 0.

28. The method of claim 23 further characterized by R, $R^1$, $R^2$ and $R^6$ being alkyl radicals, $R^3$ being a divalent saturated hydrocarbon radical, and $b$ being 1.

29. The method of claim 23 further characterized by R, $R^1$ and $R^6$ being alkyl radicals, $R^3$ being an ethylene radical and $b$ being 0.

30. The method of claim 29 further characterized by R, $R^1$ and $R^6$ being methyl and $R^3$ being a divalent saturated hydrocarbon radical.

31. The method of claim 23 further characterized by R, $R^1$ and $R^6$ being methyl and $R^3$ being propylene and $b$ being 0.

32. The method of claim 23 further characterized by the mixture consisting of a silane represented by the formula

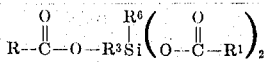

mixed with a silane represented by the formula

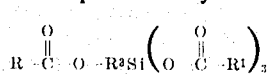

33. The method of claim 32 further characterized by the mixture consisting of a silane selected from the class consisting of

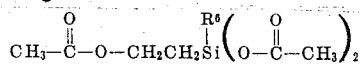

and

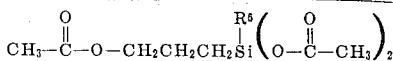

mixed with a silane selected from the class consisting of a silane represented by the formula

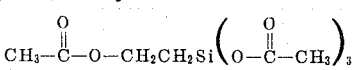

and a silane represented by the formula

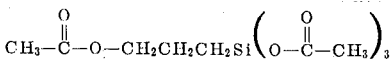

34. The method of claim 33 further characterized by the mixture consisting of a silane represented by the formula

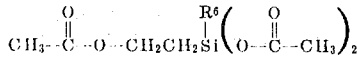

and a silane represented by the formula

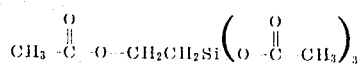

35. The method of claim 23 further characterized by R, $R^2$ and $R^6$ being alkyl radicals, $R^3$ being an ethylene radical and $b$ being 1.

36. The method of claim 23 further characterized by R, $R^1$, $R^2$ and $R^6$ being alkyl radicals, and $R^3$ being a propylene radical.

37. The method of claim 23 further characterized by R, $R^1$ and $R^6$ being methyl radicals and $R^3$ being an ethylene radical.

38. The method of claim 23 further characterized by having a filler present.

39. The method of claim 23 further characterized by having a filler and catalyst present which is selected from the class consisting of a carboxylic acid salt and a carboxylic acid chelate of a metal ranging from lead to manganese, inclusive, in the electromotive series of metals.

40. The method of claim 23 further characterized by having a catalyst present which is selected from the class consisting of a carboxylic acid salt and a carboxylic acid chelate of a metal ranging from lead to manganese, inclusive, in the electromotive series of metals.

41. The method of claim 40 further characterized by the catalyst being basic dimethyltinoleate.

42. The method of claim 23 further characterized by having at least about 50 per cent of the organo groups of the silanol chain-stopped polydiorganosiloxane being methyl, R, $R^1$ and $R^6$ being alkyl radicals, $R^2$ being a t-butyl radical and $R^3$ being an ethylene radical.

43. The method of claim 23 further characterized by having at least about 50 per cent of the organo groups of the silanol chain-stopped polydiorganosiloxane being methyl, R, $R^1$ and $R^6$ being methyl radicals, $R^3$ being a propylene radical and $b$ being 0.

* * * * *